United States Patent
Chung et al.

(10) Patent No.: US 11,586,412 B2
(45) Date of Patent: Feb. 21, 2023

(54) APPARATUS FOR PLAYBACK SOUND SOURCE AND METHOD FOR PLAYBACK SOUND SOURCE USING THE SAME

(71) Applicant: Myung Ki Chung, Seongnam-si (KR)

(72) Inventors: Myung Ki Chung, Seongnam-si (KR); Sang Hyeok Jeong, Yongin-si (KR); Jun Park, Suwon-si (KR)

(73) Assignee: Myung Ki Chung, Seongnam-si (KR)

( * ) Notice: Subject to any disclaimer, the term of this patent is extended or adjusted under 35 U.S.C. 154(b) by 0 days.

(21) Appl. No.: 17/236,632

(22) Filed: Apr. 21, 2021

(65) Prior Publication Data
US 2021/0334064 A1    Oct. 28, 2021

(30) Foreign Application Priority Data

Apr. 22, 2020 (KR) .......... 10-2020-0048962

(51) Int. Cl.
| | | |
|---|---|---|
| *G06F 3/16* | (2006.01) | |
| *G06F 21/32* | (2013.01) | |
| *G06K 7/10* | (2006.01) | |
| *H04R 1/02* | (2006.01) | |
| *H04R 3/00* | (2006.01) | |
| *G06V 40/12* | (2022.01) | |

(52) U.S. Cl.
CPC .......... *G06F 3/165* (2013.01); *G06F 21/32* (2013.01); *G06K 7/10366* (2013.01); *G06V 40/1365* (2022.01); *H04R 1/026* (2013.01); *H04R 3/00* (2013.01)

(58) Field of Classification Search
CPC .................. G06F 3/165; G06F 3/16
See application file for complete search history.

(56) References Cited

U.S. PATENT DOCUMENTS

| | | | |
|---|---|---|---|
| 6,201,474 B1* | 3/2001 | Brady | G06K 19/07758 235/487 |
| 8,849,719 B2* | 9/2014 | Baker | G11B 27/105 705/52 |
| 2006/0047603 A1* | 3/2006 | Fontijn | G06F 21/10 705/54 |
| 2006/0146770 A1* | 7/2006 | Geva | H04L 63/08 370/338 |

(Continued)

FOREIGN PATENT DOCUMENTS

| | | |
|---|---|---|
| JP | 2010-160180 A | 7/2010 |
| KR | 10-2016-0066905 A | 6/2016 |
| KR | 10-2019-0008502 A | 1/2019 |

*Primary Examiner* — Olisa Anwah
(74) *Attorney, Agent, or Firm* — Bridgeway IP Law Group, PLLC; Sang Ho Lee; Hyun Woo Shin

(57) ABSTRACT

A sound source playback apparatus includes a mounting unit, to which a sound source device may be attached and detached, and a control unit that recognizes tag information of the sound source device and performs authentication when the sound source is attached to the mounting unit, requests sound source data from the sound sources server according to a result of the tag information is authenticated, and playback the received sound source data. Accordingly, the sound source playback apparatus and the sound source playback method using the same allows permanently keep the high quality album and images of a favorite artist on a single purchase and playback a high quality sound source.

16 Claims, 9 Drawing Sheets

(56) References Cited

U.S. PATENT DOCUMENTS

| | | | |
|---|---|---|---|
| 2006/0219776 A1* | 10/2006 | Finn | G06K 7/0043 235/380 |
| 2007/0218837 A1* | 9/2007 | Lessing | H04B 5/0043 455/41.2 |
| 2008/0003944 A1* | 1/2008 | Ahlgren | G11B 23/08714 |
| 2008/0134032 A1* | 6/2008 | Pirnack | G06F 3/0481 715/700 |
| 2009/0169070 A1* | 7/2009 | Fadell | G06F 21/32 382/124 |
| 2014/0075461 A1* | 3/2014 | Kuroda | G11B 23/031 720/729 |
| 2018/0341936 A1* | 11/2018 | Manansingh | G06K 7/10297 |

* cited by examiner

APPARATUS FOR PLAYBACK SOUND SOURCE AND METHOD FOR PLAYBACK SOUND SOURCE USING THE SAME

FIELD OF THE INVENTION

The present invention relates to a sound source playback apparatus for playback a high-quality sound source and an image, and a method of playback the sound source using the same, and more particularly, to a sound source playback apparatus which allows to permanently keep a sound source and an image of a favorite artist on a single purchase and playback a high quality sound source or an image.

BACKGROUND OF THE RELATED ART

The recent trend in the music industry is 'Transition of the consumption', and users in the past had to purchase a music album or a sound source to consume the music, however, various forms of music consumption through streaming services, such as expansion of the spread of smart devices, communication speed, and development of network technology are demonstrated.

Physical music medium in the present is released in various formats, including Long Play Record (LP), Compact Cassette, Compact Disc (CD), Universal Serial Bus (USB), MiniDisc, Kihno album (Kit album), and video.

The long Play (LP), a format for a gramophone which is a sound storage medium, is one of the standards playing music, and has been developed by the Columbia Records in 1948 and was soon adopted as a new standard by the entire record industry. The LP can record about 20 minutes at one side, with 30 cm (12 inches) in size.

The Compact Cassette is a format for a magnetic recording tape and used for playback an audio device, and music may be recorded on the compact cassette tape through an alternating bias method, that is, a principle in which a voice signal is converted through the magnetic force and recorded on the tape.

The Compact Disc (CD) is an optical disc for storing digital information, which used to be a medium for storing sound information such as music, but is also applied to CD-ROM (a CD ROM), a storage device for storing other digital information in technology development. In addition, a signal is stored in the laser-grooved aluminum thin film, and likewise, since the signal is also read by the laser, is a semi-permanent medium without damages in data. An 80 to 90 minute-long audio signal is contained, and approximately 700 MB can be stored.

The Universal Serial Bus (USB) is one of the input/output standard protocols used to connect a computer and a peripheral device, and is used for connecting various devices such as a keyboard, a mouse, a game pad, a joystick, a scanner, a digital camera, a printer, a personal digital assistant (PDA), and a storage device, and is being connected as in the standard.

The MiniDisc (MD) is a medium storage device for audio recording developed by applying the magneto-optical disc technique.

The Kihno albums and videos are offline music that was introduced in 2014, and a sound source contained in the Kihno album may be listened by playing back a smart device.

In general, a song recorded by an artist or the like is included in a physical medium such as a long Play (LP), a compact cassette, and a compact disk (CD), and a method, in which directly selling the song to consumers via online and offline, is being selected. Such physical music medium sold online and offline include limited number of songs, which is about ten, and there is an inconvenience that an artist must release the physical music medium each time through producing the music, and consumers have to purchase the physical medium each time the music is released repetitively.

Further, when an artist includes images such as a live performance or the like on a physical music medium, consumers may find it inconvenient to purchase the physical music medium again. Further, there is a sense of inconvenience that existing physical music medium cannot be found when stolen which then might be listened or to be seen by other people.

Consequently, the music industry has its boundary clearly defined as an 'owner' and 'share', and due to the fourth industry revolution, the business related to the celeb (celebrity) would become prominent, so that the music medium industry and the music streaming service providing the sound source and image data of the celeb artists for storing purpose is expected to grow as an essential market.

SUMMARY OF THE INVENTION

Therefore, the present invention has been made in view of the above problems, and it is an object of the present invention to provide a sound source playback apparatus and a sound sources playback method using the same, which allows permanently keep the high quality sound source and images of a favorite artist on a single purchase.

Further, it is another object of the present invention to provide a sound source playback apparatus and a method for playback a sound source using the same allows to permanently keep the sound source of a favorite artist without further purchasing the sound source, and automatically update when a sound source is released that has already been purchased.

Further, it is another object of the present invention to provide a sound source playback apparatus and method for playback using the same provides the worthiness of keeping the sound source become more unique by making the device inoperable unless user authentication is performed even the sound source device or sound source playback apparatus is stolen or leaked.

To accomplish the above-mentioned objects, a sound source playback apparatus according to an embodiment of the present invention including: a mounting unit, in which a source medium can be attached and detached; and a control unit that recognizes tag information of the source medium and performs authentication, requests data of a sound source from a sound source sever corresponding to whether the sound source device is authenticated, and plays back the received sound source data, when the mounting unit is attached to the sound source device.

The control unit may include: a Radio-frequency identification (RFID) recognition unit configured to recognize tag information of the sound source device; and an authentication unit that compares the recognized tag information with account information registered in a user account, determines whether or not an identification value matches to perform the authentication.

The device may further include a fingerprint recognition unit configured to recognize a fingerprint, and the authentication unit may determine whether the recognized fingerprint matches the pre-stored fingerprint information and perform authentication when the fingerprint is recognized by the fingerprint recognition unit.

The control unit may include a sound source storage unit configured to store sound source data corresponding to the identification value received via the sound source server when the authentication is performed.

The sound source playback apparatus may further include a communication unit configured to receive sound source upgrade information, wherein the control unit may receive the upgrade information of a sound source through the communication unit, and when the authentication is performed, the sound source data corresponding to the identification value through the sound source server is upgraded, and may control to store in the sound source storage unit.

The sound source playback apparatus may further include a display unit configured to provide a user interface to which an input signal for playback the sound source and the control unit may include a sound source playback unit providing the service according to the input signal that is input through the display unit.

Further, the sound source playback unit may playback the sound source data stored in the sound source storage unit when the input signal input through the display unit is a sound source playback command.

According to another embodiment, the control unit may control to store sound source data corresponding to the identification value received through a sound source server in the sound source device.

The sound source playback apparatus may further include a display unit configured to provide a user interface, in which an input signal for playing back the sound source is input, and the control unit may include a sound source playback unit that provides the service according to the input signal input through the display unit.

The sound source playback unit may playback the sound source data stored in the sound source device when the input signal input through the display unit is a sound source playback command.

The sound source playback apparatus may further include a communication unit configured to receive sound source upgrade information, wherein the control unit may receive the sound source upgrade information through the communication unit, and when the authentication is performed, the sound source data corresponding to the identification value through the sound source server is upgraded, and may control to store in the sound source storage unit.

Further, the identification value may be unique tag information assigned to an RFID module of the sound source device, and the identification value may be registered in the account information of a user account who purchased the sound source device.

According to one aspect of the present invention, there is provided a sound source playback method using a sound source playback apparatus, the method comprising the steps of: recognizing tag information of the sound source device when a sound source device is installed; performing authentication by comparing the recognized tag information with account information registered in a user account and determining whether an identification value is matching; requesting sound source data corresponding to the identification value to a sound source server when the authentication is performed; receiving the sound source data from the sound source server in response to the request; storing the received sound source data; and, playing back the stored sound source.

The step of performing authentication may further include performing authentication by determining whether the recognized fingerprint matches the pre-stored fingerprint information, when a fingerprint is recognized.

Further, the step of playing back the sound source may include playing back the stored sound source data when a sound source playback command is input.

The step of playing back the sound source may further comprising the steps of: receiving sound source upgrade information; and upgrading and storing sound source data corresponding to the identification value via the sound source server when the authentication according to the received sound source upgrading information is performed.

According to another embodiment, the method of storing the sound source data may include storing the audio source data in the audio source medium.

The step of playing back the sound source may include playing back a sound source data stored in the sound source device, when a sound source playback command is input.

Further, the step may include: receiving sound source upgrade information; and upgrading sound source data corresponding to the identification value via the sound source server and storing the upgrading information in the sound source device when authentication according to the received sound source upgrade information is performed.

The identification value may be unique tag information assigned to an RFID module of the sound source device, and the identification value is registered in account information of a user account purchasing the sound source device.

The sound source playback apparatus and the sound source playback method using the same according to the present invention, allows permanently keep the high quality album and images of a favorite artist on a single purchase and playback a high quality sound source.

Further, according to the present invention, the sound source playback apparatus allows to permanently keep the sound source of a favorite artist without further purchasing the sound source, and automatically update when a new sound source is released that has already been purchased.

In addition, according to the present invention, the worthiness of keeping the sound source may become more unique by making the device inoperable unless user authentication is performed even the sound source device or sound source playback apparatus is stolen or leaked.

DETAILED DESCRIPTION OF THE PREFERRED EMBODIMENT

Figure 1:
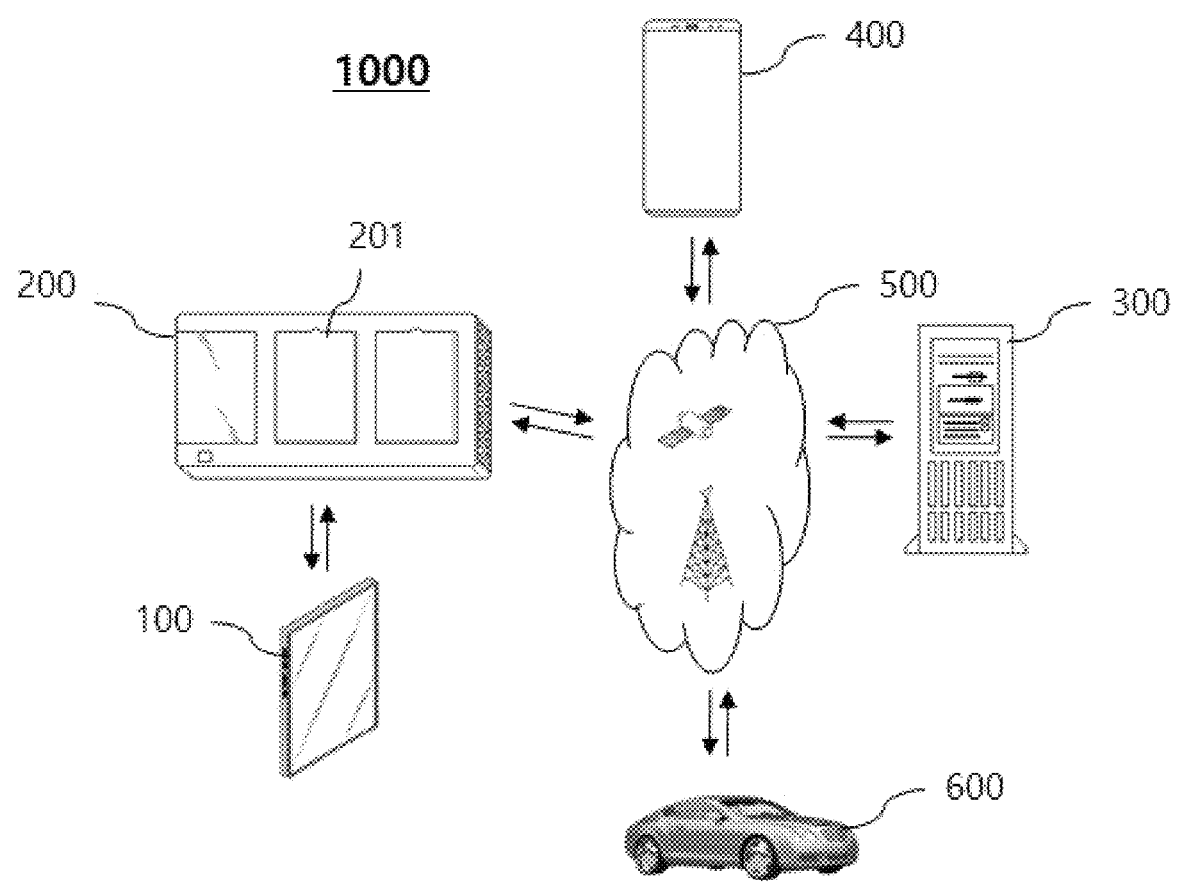
FIG. 1 is a diagram showing a sound source playback system according to an embodiment of the present invention.

Reference will now be made in detail to exemplary embodiment with reference to the accompanying drawings. In the following description of the exemplary embodiment, only essential parts for an understanding of an operation of the exemplary embodiment will be explained and other parts will not be explained when it is deemed that they make unnecessarily obscure the subject matter of the exemplary embodiment. In the drawings, the same numeral denotes the same element, and sizes of elements may be exaggerated for clarity. For convenience of description, a method and an apparatus are described together, if necessary.

FIG. 1 is a diagram showing a sound source provision system according to an embodiment of the present invention.

Referring to FIG. 1, the sound source provision system 1000 may include a sound source device 100, a sound source playback apparatus 200, a user terminal 400, and a sound source server 300. According to an embodiment, a vehicle 600 may further be included. The sound source provision system 1000 may be configured with a network 500 to transmit and receive signals each other.

In the present specification, a user may have access to information on a release of sound source from an artist through a variety of news, or purchase a sound source device 100 of each artist which are sold in outlets or, through Internet for those who wish to keep the sound source and/or images of a favorite artist, and a sound source playback apparatus 200. A user account may be assigned through the sound source server 300 for those who purchased the sound source device 100 and/or the sound source playback apparatus 200. Here, the user account may refer to identification (ID) or email used when logging into the sound source playback apparatus 200 and/or the source server 300. The user account may also be used when performing user authentication of a user who purchased the sound source device 100 and/or the sound source playback apparatus 200.

The sound source device 100 may include artist information and tag information. Here, the tag information may be a unique identification value assigned to the RFID module when the sound source device 100 is produced. Further, the unique identification value may be assigned by linking with the artist information. This identification value can be registered in the account information of the user account who purchased the sound source device 100. Meanwhile, the identification value may be configured in a serial number format on the cover of the sound source device 100. In another embodiment, the sound source device 100 can store sound source data via a sound source playback apparatus 200.

The sound source device 100 will be explained in detail with reference to FIGS. 4A, 4B and 6.

When the sound source device 100 is attached to the mounting unit 201 to which the sound sources medium 100 can be attached/detached, the sound source playback apparatus 200 can recognize the tag information of the sound source device 100 and perform user authentication. The sound source playback apparatus 200 can playback sound source data depending on whether authentication is performed. Here, the sound source data may be data including a high quality encoded sound source and/or an image. This sound source data may include sound sources and/or images recorded in the studio, in a live concert and/or through broadcast.

In one embodiment, when user authentication is performed, the sound source playback apparatus 200 may request sound source data corresponding to the identification value to the sound sources server 300. The sound source playback apparatus 200 can receive and store sound source data from the sound source server 300 by request. That is, the sound source playback apparatus 200 may playback stored sound source data. In another embodiment, the sound source playback apparatus 200 may control to store sound source data received from a sound source server 300 in a sound source device 100. The sound source playback apparatus 200 may control to playback sound source data stored in the sound source device 100.

The sound source playback apparatus 200 may output sound source data via an internal or an external speaker. Further, the sound source playback apparatus 200 may be provided with sound source update information from the sound sources server 300.

The sound source playback apparatus 200 will be explained in detail with reference to FIGS. 2 and 5.

The sound source server 300 may store sound source data corresponding to the identification value. The sound source server 300 may assign and/or manage a user account of a user who purchased the sound source device 100 and/or the sound sources playback device 200. Therefore, the sound source server 300 may manage high quality sound source data per user account. The sound source server 300 may manage sound source data according to the identification value registered in the account information of the user account. Further, the sound source server 300 may store the identification value and the user account. Thus, the sound source server 300 may verify and manage what the sound sources data that secured by the user, and what the possible sound sources can be secured through additional updates. Further, the sound source server 300 may verify and manage which sound source data is stored in the sound-source playback apparatus 200 linked to the user account. The sound source server 300 may verify that the user account is activated. A state which a user account is activated may refer to a state which the user is allowed to keep its membership. Here, a method for keeping membership including: making payments periodically, making a payment for a lifetime membership, making donation for a sound source release of an artist and the like. According to an embodiment, the sound source server 300 may provide sound source upgrade information with the user account activated.

The sound source server 300 may transmit sound source data in response to a request from a sound source playback apparatus 200. Meanwhile, the sound source server 300 may check sound source data corresponding to the user account, check whether a sound source for download purpose has been extracted and stored, and if not stored, then provide sound source data for download purpose to the sound source playback apparatus 200. If the sound source data for download purpose is already stored, a sound source playback apparatus 200 with a message that notify that is the already-stored sound source and a user terminal 400 may be provided.

In another embodiment, the sound source server 300 may provide sound source data by streaming to the user terminal 400 to which the user account is logged in. The sound source server 300 may provide sound source update information to the sound sources playback device 200 and/or the user terminal 400 when a new sound source is released from each artist.

The user terminal 400 refers to a terminal of a user who has purchased the sound source device 100 and/or sound source playback apparatus 200, and the user terminal 400 may be, for example, an intelligent speaker, a computer, a smartphone, a notebook, a smart TV, a tablet PC, a PMP, or the like. The user terminal 400 may download and execute an application that allows to link with the sound source server 300. The user terminal 400 may create a user account assigned via the source server 300. The user terminal 400 may log in the user account assigned and register the identification value of the sound source device 100 with the account information. That is, the user can log in the user account via the user terminal 400 and register the serial number configured in the sound source device 100 with the account information.

In another embodiment, the user terminal 400 may perform user authentication and provided with sound source data according to a user account in streaming through the sound source server 300. In addition, the user terminal 400 may be provided with sound source update information from the sound source server 300.

A network 500 is a wired/wireless communication network such as a ground wave, a satellite, a cable, or the Internet, and mediates communication between the sound source playback apparatus 200 and the sound source server 300, the sound source playback apparatus 200 and the user terminal 400, the user terminal 400 and the sound source server 300, and the user terminal 400 and a vehicle 600.

The sound source server 300 transmits sound source data to the sound source playback apparatus 200 via the network 500, and the sound source playback apparatus 200 and the sound source server 300 performs authentication by logging in the user account to the user terminal 400 via the network 500, and may be provided with the sound source data in real-time from the sound source server 300 via the network 500.

The vehicle 600 may output sound source data by linking with the sound source playback apparatus 200 or the user terminal 400.

Figure 2:
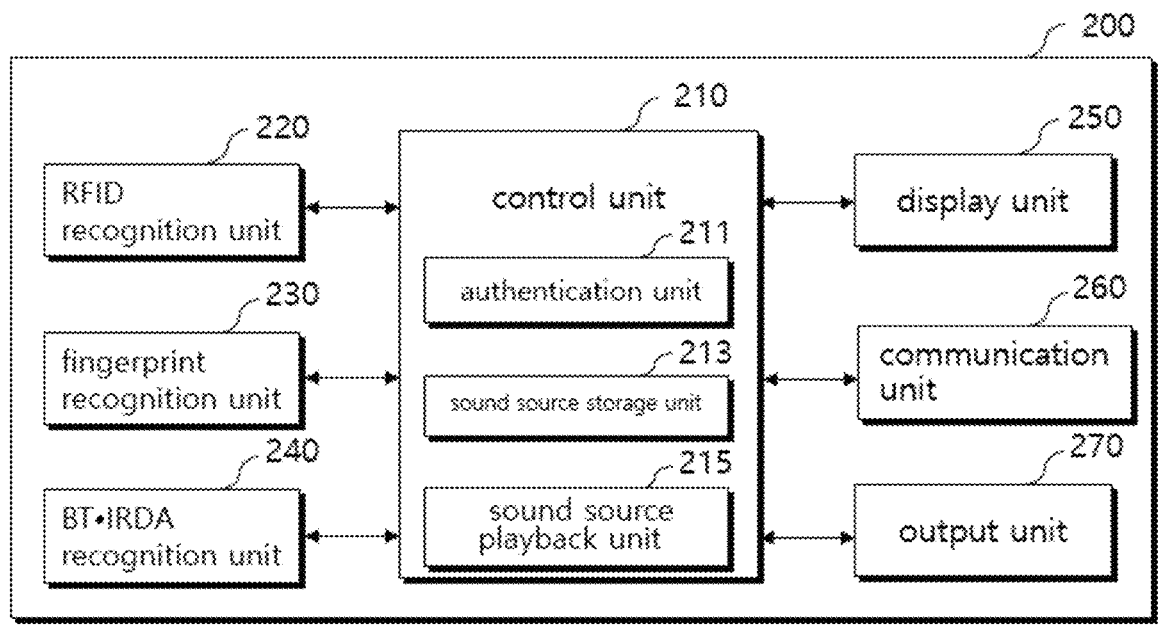
FIG. 2 is a block diagram specifically showing a sound source playback apparatus according to an embodiment of the present invention.

FIG. 2 is a block diagram specifically showing a sound source playback apparatus according to an embodiment of the present invention.

Referring to FIGS. 1 and 2, the sound source playback apparatus 200 may include a control unit 210, an RFID recognition unit 220, a fingerprint recognition unit 230, a Bluetooth and Infrared Data Association (BT-IrDA) communication unit 240, a display unit 250, a communication unit 260, and an output unit 270. The sound source playback apparatus 200 is a device that communicates with the sound source server 300 to store encoded sound source data or to decode and playback encoded sound source data.

The control unit 210 may perform user authentication and request sound source data from the sound source server 300 to control to playback the received source data. This control unit 210 may include an authentication unit 211, a sound source storage unit 213, and the sound source playback unit 215. The control unit 210 may control, when the sound source upgrade information is received and user authentication is performed, to upgrade and store sound source data corresponding to the identification value in the sound source storage unit 213 via the sound source server 300.

The authentication unit 211 may compare the tag information recognized through the RFID recognition unit 220 with the account information registered in the user account to determine whether the identification value matches. The authentication unit 211 may compare the fingerprint recognized by the fingerprint recognition unit 230 with the pre-stored fingerprint information to determine whether the fingerprint matches. The authentication unit 211 may perform user authentication through the determination process above-mentioned. Meanwhile, the authentication unit 211 may receive account information when logged in to the user account through the user terminal 400, or may confirm the account information, when logged into the user accounting through the display unit 250. Here, the identification value may be unique tag information assigned to the RFID module when the sound source device 100 is produced. The unique identification value may be assigned by linking with the artist information. Such identification value may be registered in the account information of the user account who purchased the sound source device 100.

The sound source storage unit 213 may store sound source data received from the sound source server 300. The sound source storage unit 213 may be implemented as a flash memory module. The sound source storage unit 213 may store sound source data corresponding to the identification value, that is, the sound source data corresponding to sound source information of the artist. For example, in the case where the identification value is given as the artist 'celeb A', the sound source data of the artist 'celeb A' may be stored in the audio source storage unit 213. Further, the sound source storage unit 213 may upgrade and store sound source data received from the sound sources server 300.

The sound source playback unit 215 may decode the encoded sound source data. The sound source playback unit 215 may provide the service according to an input signal which is input through the display unit 250. The sound source playback unit 215 can decode sound source data stored in the sound source storage unit 213 when the input signal which is input through the display unit 250 is a sound source playback command.

The RFID recognition unit 220 can recognize tag information from the sound source device 100. To this end, the RFID recognition unit 220 may include an antenna element for efficiently radiating high-frequency power to electromagnetic waves in the air or efficiently receiving electromagnetic energy in the air. Thus, power and tag information between the RFID recognition unit 220 and the sound source device 100 may be exchanged via the antenna element.

The fingerprint recognition unit 230 may recognize a fingerprint of a user. The fingerprint recognition unit 230 is applied with a biometric technology, and may be implemented by selecting a method of reading a special characteristics of a fingerprint contacted with the surface of a silicon chip by using an electrical conductivity property of the skin into an electrical signal, or a method in which an image of a reflected fingerprint is input to a charge coupled device (CCD) through a highly refractive lens by applying the light to the fingerprint which is placed on the recognition unit.

The BT-IrDA communication unit 240 may transmit and receive signals and data to and from a remote controller (described later) using Bluetooth (BT) and infrared communication (IrDA) via USB.

The display 250 may provide a user interface under the control of the control unit 210. The display 250 may be implemented as a touch screen. Thus, the display unit 250 may receive an input signal for sound source playing back through a user interface provided from a user. The display unit 250 may provide the service according to the control of the control unit 210. For example, the display unit 250 may provide a user interface for performing user authentication when the sound source playback apparatus 200 is turned on to log in to a user account. In addition, when user authentication is performed, the display unit 250 may provide a user interface to receive a sound source playback command. Alternatively, the sound source device 100 may be selected via the display unit 250 when a plurality of sound source device 100 is mounted. According to an embodiment, the display unit 250 may display an image of the output sound source data.

The communication unit 260 can transmit and receive signals and sound source data to and from the sound source server 300 or the user terminal 400. The communication unit 260 may request the sound source server 300 for sound source data corresponding to the identification value, and receive the corresponding sound source data. The communication unit 260 may receive sound source update information from the sound source server 300. The communication unit 260 may receive account information of a user account from the user terminal 400.

The output unit 270 may output the decoded sound source data. The output unit 270 may include a speaker for outputting sound source data. The output 270 may also include a connection terminal. The output unit 270 may output sound source data through an external speaker connected to the connection terminal, or output sound source data via an external loudspeaker connected through the communication unit 260. In addition, in the case where the sound source data includes an image, the image may be displayed through the display unit 250, or may also be displayed as an external image display device through the connection terminal of the output unit 270.

Figure 3A:
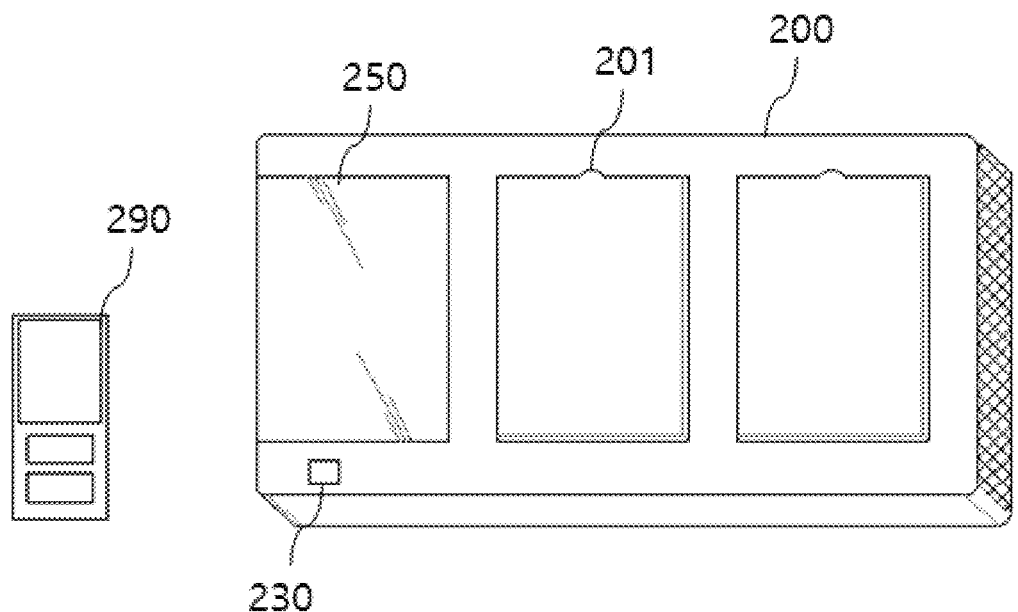
FIGS. 3A and 3B are schematic diagrams showing various sound source playback apparatuses according to an embodiment of the present invention.
Figure 3B:
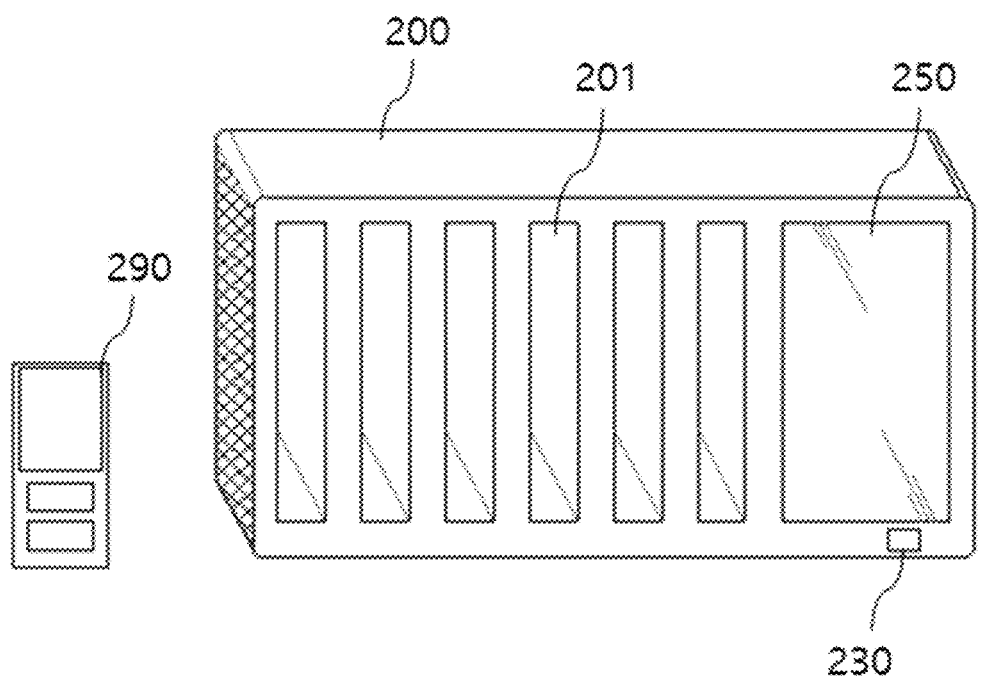

FIGS. 3A and 3B are schematic diagrams showing various sound source playback apparatuses according to an embodiment of the present invention. FIG. 3A is a sound source playback apparatus in a case where the sound source device 100 implements a horizontally detachable mounting unit 201, and FIG. 3B is the sound sources playback device in a case where the sound source device 100 implements a vertically detachable mounting unit 201. Referring to FIGS. 2, 3A and 3B, the sound source playback apparatus 200 may include a mounting unit 201, a fingerprint recognition unit 230, and a display unit 250. The sound source playback apparatus 200 may include a remote controller 290 provided separately.

The mounting unit 201 may be configured horizontally or vertically so that the sound source device 100 can be detached and attached thereto. The mounting unit 201 may be provided with one or more sound source device 100 to mount one or more sound source device 100. As shown in FIG. 3A, the mounting unit 201 is formed with a mounting groove so as to expose the front surface of the sound source device 100, and can be mounted so that the rear surface of the sound signal medium 100 may be in contact with the surface. Alternatively, as shown in FIG. 3B, the sound source device 100 may be formed in a slot shape so as to expose a side surface thereof. Thus, the sound source device 100 may be vertically inserted and mounted in the mounting unit 201. On the side surface of the sound source device 100, a portion where the name of the artist is imprinted may be exposed.

The fingerprint recognition unit 230 is provided on one side of the sound source playback apparatus 200, and may recognize a fingerprint of a user. The fingerprint recognition unit 230 is applied with a biometric technology, and may be implemented by selecting a method of reading a special characteristics of a fingerprint contacted with the surface of a silicon chip by using an electrical conductivity property of the skin into an electrical signal, or a method in which an image of a reflected fingerprint is input to a charge coupled device (CCD) through a highly refractive lens by applying the light to the fingerprint which is placed on the recognition unit. According to one embodiment, the fingerprint recognition unit 230 may include a power supply function. That is, when the fingerprint recognition unit 230 is implemented as a silicon chip, the fingerprint recognition unit 230 may be used as a pressure sensitive element whose resistance is varied by applying pressure. Accordingly, the fingerprint recognition unit 230 can turn on/off the power source of the sound source playback apparatus 200, and recognize a fingerprint. According to an embodiment, the fingerprint recognition unit 230 may be implemented as a separate device.

The BT-IrDA communication unit 240 may transmit and receive signals and data to and from a remote controller (described later) using Bluetooth (BT) and infrared communication (IrDA) via USB. Bluetooth may transmit data at a rate of up to 1 Mbps in a short distance within 10 meters, and infrared communication may transmit and receive signals using infrared light in the frequency band.

The display unit 250 is formed on one side of the sound source playback apparatus 200, and may provide a user interface under control of the control unit 210. The display 250 may be implemented as a touch screen. Thus, the display unit 250 may receive an input signal from a user. The display unit 250 may provide the service according to the control of the control unit 210. For example, the display unit 250 may provide a user interface for performing user authentication when the sound source playback apparatus 200 is turned on to log in to a user account. When user authentication is performed, the display unit 250 may provide a user interface to receive a sound source playback command. Alternatively, the sound source device 100 may be selected via the display 250 when a plurality of sound source device 100 is mounted. According to an embodiment, the display unit 250 may display an image of the output sound source data.

The remote controller 290 is used for both Bluetooth and infrared communication, and the remote control 290 may transmit and receive signals and data via the BT-IrDA communication unit 240. The remote controller 290 may provide a user interface under the control of the control unit 210. Thus, the sound source playback apparatus 200 may be operated in the proximity through the remote controller 290.

When the sound source device 100 is attached to the mounting unit 201, the authentication unit 211 compares the tag information recognized from the sound sources medium 100 with the account information registered in the user account, and determines whether the identification values match. The fingerprint recognized by the finger recognition unit 230 is compared with the pre-stored fingerprint information to determine whether the fingerprint matches. Thus, a user interface is provided through the display 250 when the user authentication is performed. The sound source playback unit 215 may provide a service according to an input signal input through the display unit 250. That is, when a sound source playback command is input, the sound source playback unit 215 may decode sound source data stored in a sound source storage unit 213. The output unit 270 may output the decoded sound source data.

Accordingly, even if the sound source device 100 or sound source playback apparatus 200 is stolen or leaked, making the device inoperable unless a 3-step user authentication is performed, thereby increasing the worthiness of keeping the sound source.

Figure 4A:
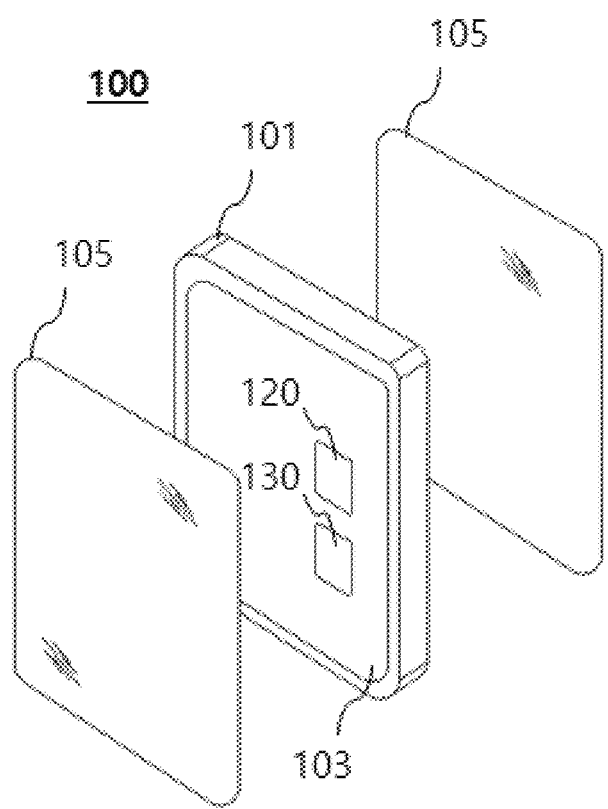
FIGS. 4A and 4B are schematic diagrams showing various sound source device according to one embodiment of the present invention.
Figure 4B:
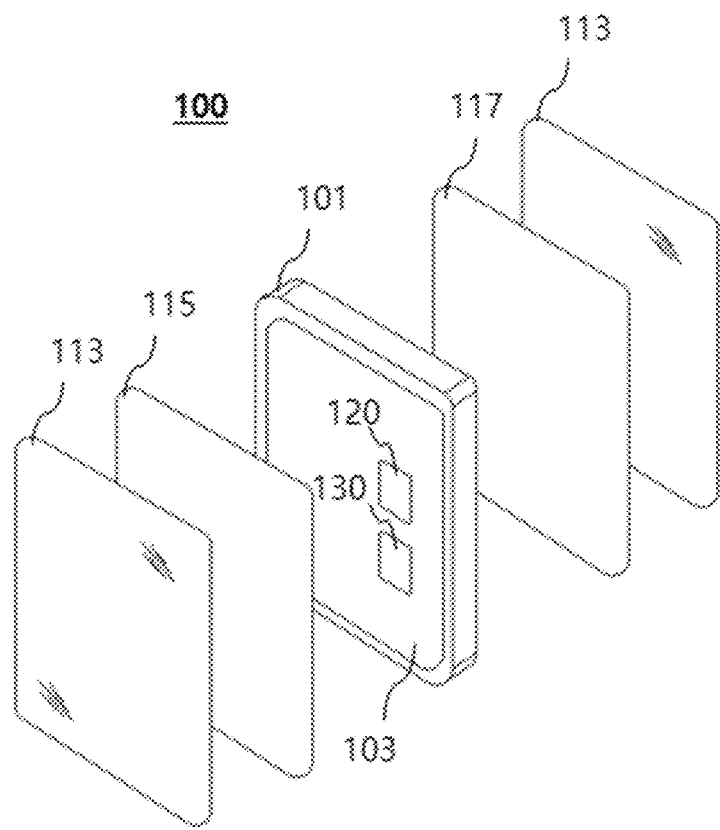

FIGS. 4A and 4B are schematic diagrams showing various sound source device according to one embodiment of the present invention.

Referring to FIG. 4A, the sound source device 100 may include an outer portion 101, an antenna unit 130 formed on a main board 103, an RFID module 120, and a cover 105.

The outer portion 101 may be a protective frame for improving durability of the sound source device 100. This outer portion 101 may be comprised of aluminum, magnesium, or the like for making an electrical contact. An artist name may be labeled on one side of the outer portion 101. The labeling may be imprinted through the laser and perpetuated without being degraded. A main board 103 may be inserted inside the outer part 101. That is, the outer portion 101 and the main board 103 may be coupled and integrally implemented.

The main board 103 is provided with an antenna unit 130 and an RFID module 120. The main board 103 is comprised of beryllium copper material such as bronze and pogo pins, and may enhance conductivity and durability without wear.

The RFID module 120 is recognizable by radio frequency and may include artist information and tag information. The tag information is a unique identification value given at the time of producing the sound source device 100, and the unique identification values may be assigned by linking with the artist information. This identification value may be registered in the account information of the user account who purchased the sound source device 100. Meanwhile, the identification value may be configured in a serial number format on the cover 105.

The tag information stored in the RFID module 120 can be recognized by the RFID recognition unit 220 of the sound source playback apparatus 200. To this end, the antenna unit 130 may include an element for efficiently radiating high-frequency power to electromagnetic waves in the air or efficiently receiving electromagnetic energy in the air. The tag information may be transmitted to the sound source playback apparatus 200 via the antenna unit 130. That is, power and tag information may be exchanged between the sound source device 100 and sound source playback apparatus 200 via the antenna unit 130.

The cover 105 may cover the body of the sound source device 100 and may cover the front and rear surfaces with the outer portion 101 and the main board 103 interposed therebetween. The cover 105 may be comprised of a Mahogany material and may serve to protect the main board 103. In addition, the cover 105 may enhance the durability of the sound source device 100, reduce distortion, and make the gloss clearer to improve a sense of aesthetic.

The outer portion 101 and the cover 105 may be bonded using optical adhesive technique.

Referring to FIG. 4B, the sound source device 100 may include an outer portion 101, an antenna unit 130 formed on the main board 103, an RFID module 120, a first cover 115, a second cover 117, and a tempered glass 113. Descriptions of the same reference numerals as those in FIG. 4A are omitted.

The first cover 115 and the second cover 117 may be implemented by printing on a paper or a vinyl such as a film paper. The inkjet printing, laser printing, or ultraviolet (UV) inkjet printing may be used as a printing method. Meanwhile, the second cover 117 may be comprised of a metal material such as aluminum, titanium, beryllium, copper, which is not a method of printing on the paper or the vinyl.

The tempered glass 113 may be a high-strength tempered glass 113 to protect the first cover 115, the second cover 117 and the main board 103 inside the music source medium 100. The tempered glass 113 may be implemented as synthetic tempered glass components including a tempered glass component, acrylic, polycarbonate, or the like. The tempered glass 113 may be bonded together with the first cover 115 and the second cover 117 and the outer portion 101 into which the main board 103 is inserted using an optical adhesive technique. In this way, by bonding the outer portion 101, the first cover 115, the second cover 117, and the tempered glass 113 into which the main board 103 is inserted using the optical adhesive technique, the production speed of the sound source device 100 may be increased, durability may be improved, and may allow to be waterproofed.

Figure 5:
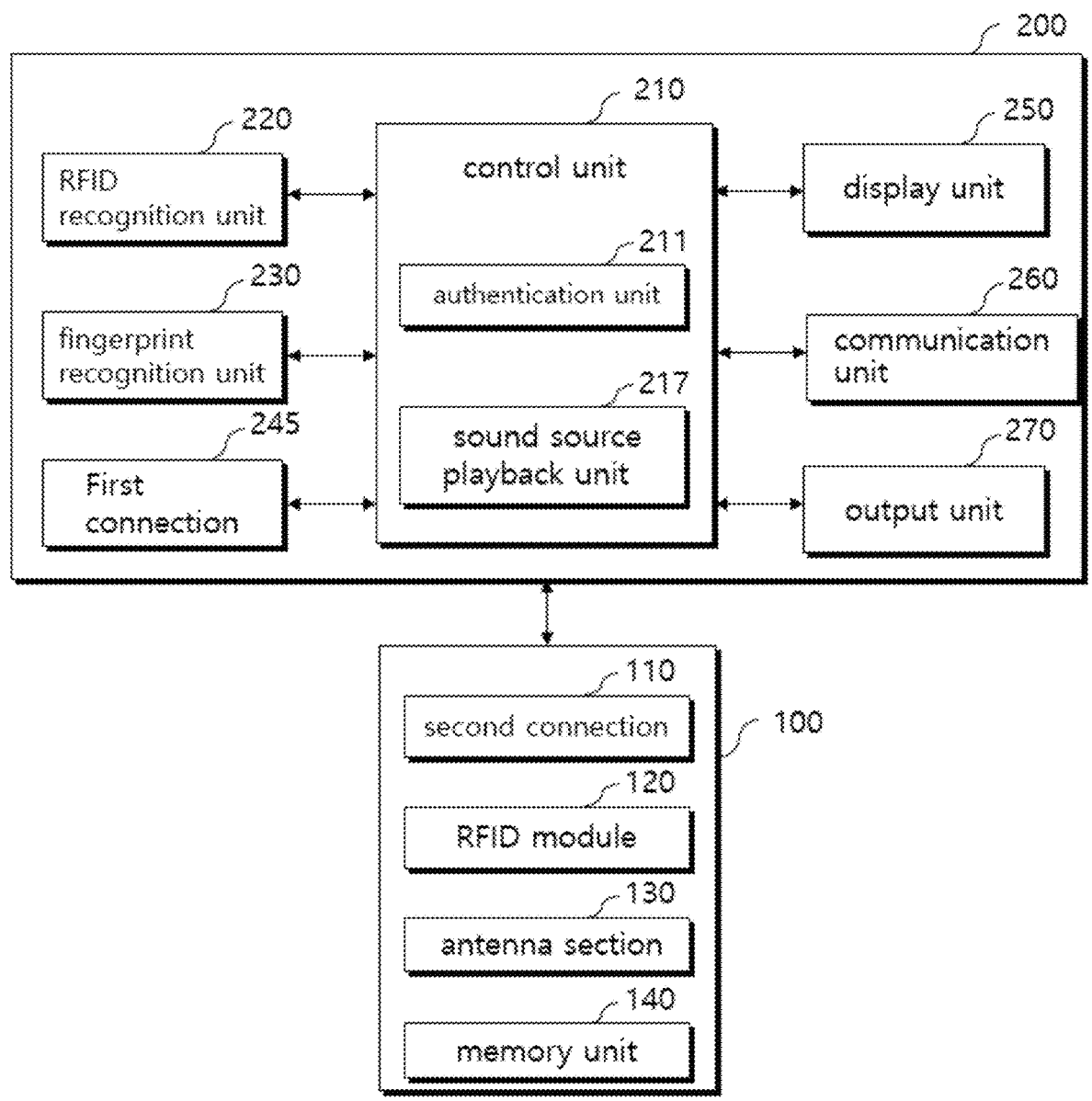
FIG. 5 is a block diagram that specifically showing a sound source device and sound source playback apparatus according to another embodiment of the invention.

FIG. 5 is a block diagram that specifically showing a sound source device and sound source playback apparatus according to another embodiment of the present invention.

A sound source device 100 and a sound source playback apparatus 200 in the case where sound source data is stored in the sound source device 100 will be described according to another embodiment.

Referring to FIGS. 2 and 5, the sound source device 100 may include a second connection unit 110, an RFID module 120, an antenna unit 130, and a memory unit 140.

The second connection unit 110 is a connection terminal to connect with the sound source playback apparatus 200, and may be formed on one side of the main board 103. The outer portion 101, in contact with the main board 103 on which the second connection unit 110 is formed, may be provided with a groove to expose the second connection unit 110.

In addition, the second connection unit 110 is connected via the first connection unit 245 of the sound source playback apparatus 200 to transmit and receive sound source data to and from the sound source playback apparatus 200. This second connection unit 110 may be use plastic so that the electrical transmission to the main board 103 may not abnormal. Accordingly, the risk of being electrically short-circuited may be prevented. The second connection unit 110 may use to make an electrical contact. Making such an electrical contact may prevent making errors and improve making an electric contact.

The RFID module 120 is recognizable by radio frequency and may include artist information and tag information. The tag information is a unique identification value assigned when the sound source device 100 is produced, and the identification value may be registered in the account information of the user account who purchased the source medium 100.

The tag information stored in the RFID module 120 may be recognized by the RFID recognition unit 220 of the sound source playback apparatus 200. To this end, the antenna unit 130 may include an element for efficiently radiating high-frequency power to electromagnetic waves in the air or efficiently receiving electromagnetic energy in the air. The tag information may be transmitted to the sound source playback apparatus 200 via the antenna unit 130. That is, power and tag information may be exchanged between the sound source device 100 and sound source playback apparatus 200 via the antenna unit 130.

The memory unit 140 may store sound source data received from the sound source playback apparatus 200. This memory portion 140 may be implemented as a flash memory module. In addition, the memory unit 140 may upgrade and store sound source data received from the sound source playback apparatus 200.

Accordingly, the sound source device 100 may store sound source data corresponding to the identification value, that is, corresponding to the sound source information of the artist. For example, in the case where the identification value is given as the artist 'celeb A', the sound source data of the artist 'celeb A' may be stored in the sound source device 100.

The sound source playback apparatus 200 may include a control unit 210, an RFID recognition unit 220, a fingerprint recognition unit 230, a first connection unit 245, a display unit 250, a communication unit 260, and an output unit 270. The sound source playback apparatus 200 communicates with the sound source server 300 to decode encoded sound source data and playback.

The control unit 210 may perform user authentication, request sound source data from the sound source server 300, and control to store the received sound source data in the sound source device 100. The control unit 210 may include an authentication unit 211 and a sound source playback unit 217. In addition, the control unit 210 may control, when the sound source upgrade information is received and user authentication is performed, to upgrade sound source data corresponding to the identification value and store the upgrade result in a sound source device 100.

The authentication unit 211 may compare the tag information recognized through the RFID recognition unit 220 with the account information registered in the user account to determine whether the identification value matches. Further, the authentication unit 211 may compare the fingerprint recognized by the fingerprint recognition unit 230 with the pre-stored fingerprint information to determine whether the fingerprint matches. The authentication unit 211 may perform user authentication through the determination process explained above. Meanwhile, the authentication unit 211 may receive account information when logged in to the user account through the user terminal 400, or may confirm the account information, when logged into the user accounting through the display unit 250. Here, the identification value may be unique tag information given to the RFID module when the sound source device 100 is produced. Further, the unique identification value may be assigned by linking with the artist information. This identification value may be registered in the account information of the user account who purchased the sound source device 100.

The sound source playback unit 217 may decode the encoded sound source data. The sound source playback unit 217 may provide the service according to an input signal input through the display unit 250. The sound source playback unit 217 may decode sound source data stored in the sound source device 100 connected via the first connection unit 245 when the input signal input via the display unit 250 is a sound source playback command.

The RFID recognition unit 220 may recognize tag information from the sound source device 100. To this end, the RFID recognition unit 220 may include an antenna element for efficiently radiating high-frequency power to electromagnetic waves in the air or efficiently receiving electromagnetic energy in the air. Thus, power and tag information between the RFID recognition unit 220 and the sound source device 100 can be exchanged via the antenna element.

The fingerprint recognition unit 230 may recognize a fingerprint of a user. The fingerprint recognition unit 230 is applied with a biometric technology, and may be implemented by selecting a method of reading a special characteristics of a fingerprint contacted with the surface of a silicon chip by using an electrical conductivity property of the skin into an electrical signal, or a method in which an image of a reflected fingerprint is input to a charge coupled device (CCD) through a highly refractive lens by applying the light to the fingerprint which is placed on the recognition unit.

The first connection unit 245 is connected via the second connection portion 110 of the sound source device 100 to transmit and receive sound source data to and from the sound sources medium 100. The second connection unit 110 may use to make an electrical contact. Making such an electrical contact may prevent making errors and improve making an electric contact.

The display 250 may provide a user interface under the control of the control unit 210. The display 250 may be implemented as a touch screen. Thus, the display unit 250 may receive an input signal for sound source playing back through a user interface provided from a user. The display unit 250 may provide the service according to the control of the control unit 210. For example, the display unit 250 may provide a user interface for performing user authentication when the sound source playback apparatus 200 is turned on to log in to a user account. When user authentication is performed, the display unit 250 may provide a user interface to receive a sound source playback command. Alternatively, the sound source device 100 may be selected via the display 250 when a plurality of sound source device 100 is mounted. According to an embodiment, the display unit 250 may display an image of the output sound source data.

The communication unit 260 may transmit and receive signals and sound source data to and from the sound source server 300 or the user terminal 400. The communication unit 260 may request the sound source server 300 for sound source data corresponding to the identification value, and receive the corresponding sound source data. The communication unit 260 may receive sound source update information from the sound source server 300. Further, the communication unit 260 may receive account information of a user account from the user terminal 400.

The output unit 270 may output the decoded sound source data. The output unit 270 may include a speaker for outputting sound source data. The output 270 may also include a connection terminal. The output unit 270 may output sound source data through an external speaker connected to the connection terminal, or output sound-source data via an external loudspeaker connected through the communication unit 260. In addition, in the case where the sound source data includes an image, the image may be displayed through the display unit 250, or may also be displayed as an external image display device through the connection terminal of the output unit 270.

Figure 6:
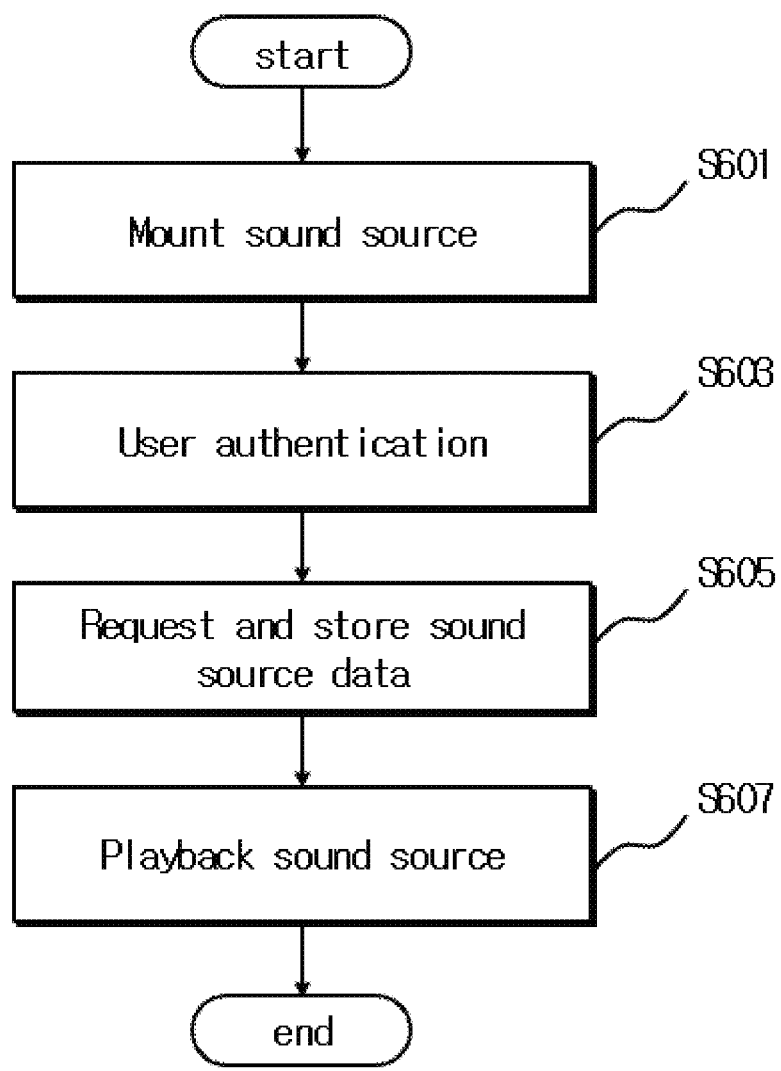
FIG. 6 is a flowchart illustrating sound source playback method using the sound source playback apparatus according to one embodiment of this invention.

FIG. 6 is a flowchart illustrating sound source playback method using the sound source playback apparatus according to one embodiment of this invention.

Referring to FIGS. 2 and 6, a sound source playback method using the sound source playback apparatus 200 according to an embodiment of the present invention is explained. When the sound source device 100 is mounted (S601), the sound source playback apparatus 200 recognizes tag information of the sound sources medium 100 via the authentication unit 211, compares the recognized tag information with account information registered in the user account, determines whether the identification value matches, and performs step S603 of user authentication. Here, the identification value is unique tag information assigned to the RFID module of the sound source device 100, and the identification values may be registered in account information of a user account who has purchased the source medium 100. The authentication unit 211 may compare the fingerprint with the pre-stored fingerprint information to determine whether the fingerprint matches.

When the user authentication is performed, the control unit 210 requests the sound source server 300 for sound source data corresponding to the identification value, and performs a step S605 of storing, in a sound source storage unit 213, the sound device data received from the sound supply server 300 according to the request.

Further, when user authentication is performed, the sound source playback unit 215 is provided with a user interface through the display unit 250, and can provide a corresponding service according to an input signal input through the user interface. When the input signal is a sound source playback command, the sound source reproducing unit 215 executes a step of playing back the stored sound source data (S607).

Thus, the present invention may allow keeping the sound source permanently and appreciating the sound source of an artist with a single purchase.

Figure 7:
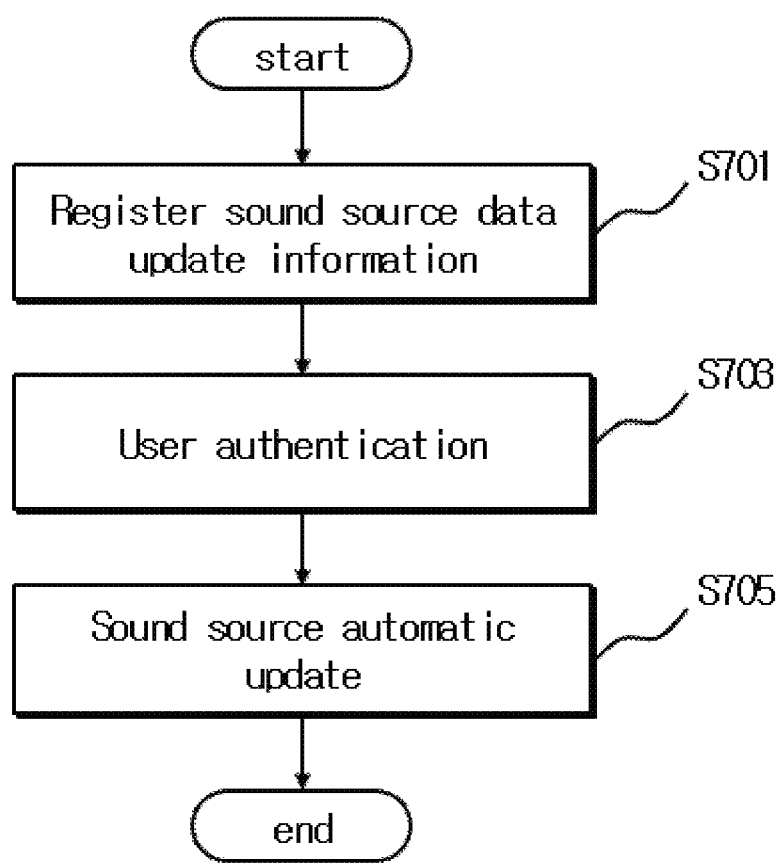
FIG. 7 is a flowchart illustrating a sound source updating method using the sound source playback apparatus according to an embodiment of the invention.

FIG. 7 is a flowchart for explaining a sound source updating method using the sound source playback apparatus according to an embodiment of the present invention.

Referring to FIGS. 1 and 7, a method in which the sound source playback apparatus 200 updates sound source data via the sound sources server 300 is explained. Here, the sound source data may be data including a high quality encoded sound source and/or an image. This sound source data may include sound sources and/or images recorded in the studio, in a live concert and/or through broadcast.

The sound source server 300 may store sound source data corresponding to the identification value. The sound source server 300 may manage sound source data according to the identification value registered in the account information of the user account. Thus, the sound source server 300 may verify and manage what the sound sources data that secured by the user, and what the possible sound sources can be secured through additional updates. The sound source server 300 may verify that the user account is activated. A state which a user account is activated may refer to a state which the user is allowed to keep its membership. Here, a method for keeping membership including: making payments periodically, making a payment for a lifetime membership, making donation for a sound source release of an artist and the like. According to an embodiment, the sound source server 300 may provide sound source upgrade information with the user account activated.

If the sound source playback apparatus 200 receives sound source update information from sound source server 300 (S701), it performs step S703 of performing user authentication according to the received sound source upgrading information.

The step of performing user authentication (S703) executes the step of recognizing the tag information of the sound source device 100 via the authentication unit 211, comparing the recognized tag information with the account information registered in the user account, determining whether the identification value matches, and performing the user authentication. Here, the identification value is unique tag information given to the RFID module of the sound source device 100, and the identification values may be registered in account information of a user account who has purchased the light source medium 100. The authentication unit 211 may compare the fingerprint with the pre-stored fingerprint information to determine whether the fingerprint matches.

Then, when the user authentication is performed, the control unit 210 executes a step S705 of automatically updating the sound source data via the sound source server 300 and storing it in the sound-source storage unit 213.

A user interface is provided through the display section 250, and the sound source playback section 215 may provide the corresponding service according to an input signal input through the user interface. When the input signal is a sound source playback command, the sound source playback unit 215 may playback stored sound source data.

Accordingly, the sound source playback apparatus 200 allows to permanently keep the music source of a favorite artist without further purchasing the sound source, and automatically update when a new album is released that has already been purchased. Thus, the latest sound source may be listened or viewed.

Figure 8:
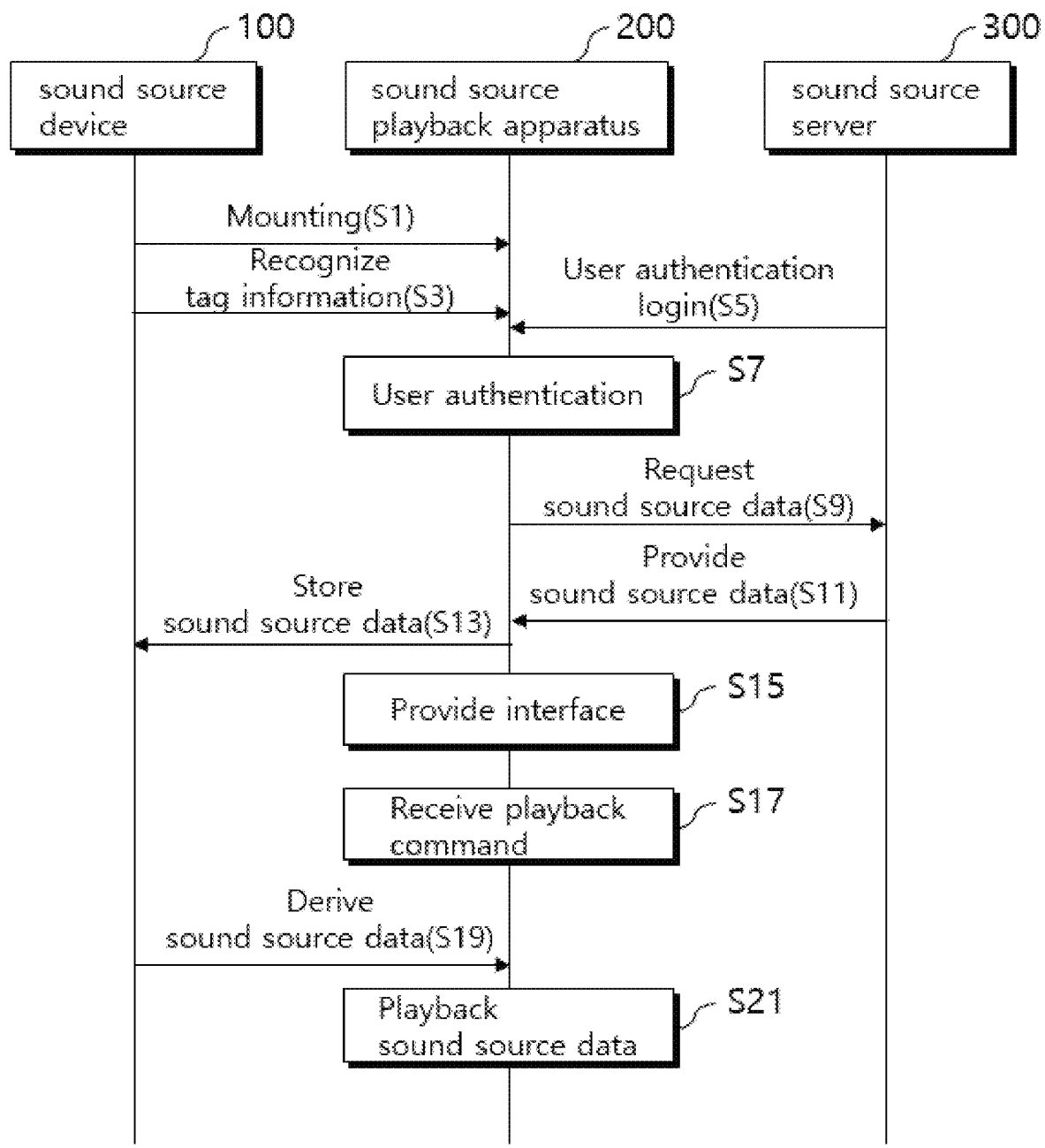
FIG. 8 is a flowchart illustrating a sound source playback method according to another embodiment of the present invention.

FIG. 8 is a flowchart for explaining a sound source playback method according to another embodiment of the present invention.

Referring to FIGS. 5 and 8, a method of playing back a sound source by using the sound source playback apparatus 200 in a case where sound source data is stored in the sound source device 100 according to another embodiment will be explained.

When the sound source device 100 is mounted (S1), the first connection unit 245 is connected via the second connection unit 110 of the sound signal medium 100 to transmit and receive sound source data. Further, a step S3 of recognizing tag information of the sound source device 100 via the RFID recognition unit 220 is executed. Then, perform login to the user account and receiving account information via the sound source server 300 (S5).

Then, the authentication unit 211 performs step S7 of performing user authentication. The step S7 of performing user authentication may compare the recognized tag information with the account information registered in the user account to determine whether the identification value matches. Further, the authentication unit 211 may compare the fingerprint recognized by the fingerprint recognition unit 230 with the pre-stored fingerprint information to determine whether the fingerprint matches. The authentication unit 211 may perform user authentication through the determination process mentioned above, while the identification value may be unique tag information given to the RFID module when the sound source device 100 is produced. Further, the unique identification value may be assigned by linking with the artist information. This identification value may be registered in the account information of the user account who purchased the sound source device 100.

The control unit 210 performs user authentication and executes step S9 of requesting the sound source data corresponding to the identification value from the sound source server 300. Step S11 is executed in which the sound source server 300 provides sound source data corresponding to the identification value to the sound sources playback device 200 by the request. Accordingly, the control unit 210 may control to store the received sound source data in the sound source device 100. Accordingly, the memory unit 140 of the sound source device 100 may store sound source data received from the sound source playback apparatus 200. This memory unit 140 may be implemented as a flash memory module. In addition, the memory unit 140 can upgrade and store sound source data received from the sound source playback apparatus 200, so that the sound source device 100 can store sound sources data corresponding to identification values, that is, sound source information of artists. For example, in the case where the identification value is given as the artist 'celeb A', the sound source data of the artist 'celeb A' may be stored in the sound source device 100.

When the user authentication is performed, the display unit 250 provides a user interface to input a sound source playback command (S15).

Then, the sound source playback unit 217 performs a step S17 of receiving a sound source reproducing command via the display unit 250.

Accordingly, the control unit 210 executes a step S19 of deriving sound source data stored in the sound source device 100 connected via the first connection unit 245.

The sound source playback unit 217 executes a step S21 of playing back sound source data stored in the sound source device 100 connected via the first connection unit 245. In other words, the sound source playback unit 217 may decode the encoded sound source data and output the decoded sound sources data via the output unit 270. The output unit 270 may include a speaker for outputting sound source data. The output 270 may also include a connection terminal. The output unit 270 may output sound source data through an external speaker connected to the connection terminal, or output sound source data via an external loudspeaker connected through the communication unit 260. In addition, in the case where the sound source data includes an image, the image may be displayed through the display unit 250, or may be displayed as an external image display device through the connection terminal of the output unit 270.

Accordingly, even if the sound source device 100 or the sound source playback apparatus 200 is stolen or leaked, it is inoperable unless user authentication such as recognizing tag information from a sound source device, checking account information of a user account, recognizing a fingerprint, or the like is performed, thereby increasing the worthiness of keeping the sound source.

So far, the present invention has been described in detail with reference to the preferred embodiment shown in the drawings. These examples are merely illustrative and not intended to limit the present invention, and should be considered in descriptive sense only and not for purposes of limitation. The true technical protection scope of the present invention should be defined by the technical spirit of the appended claims rather than the foregoing description. Although specific terms have been used herein, they are used only for the purpose of illustrating the concept of the invention and are not intended to limit the scope of the invention according to the claims or the claims. Each step of the present invention does not necessarily have to be carried out in the order described, but may be performed in parallel, alternatively or separately. Therefore, those skilled in the art will understand that various modifications and equivalents can be made without departing from the essential technical spirit of the invention as claimed in the claims. Equivalents are to be understood to include not only currently known equivalents but also equivalents to be developed in the future, that is, all components invented to perform the same function regardless of structure.

REFERENCE NUMERALS IN THE DRAWINGS

1000: sound source playback system
100: sound source device
101: outer portion 103: main board
105: cover
113: tempered glass
115: first cover
117: second cover
110: second connection
120: RFID module
130: antenna section
140: memory unit
200: sound source playback apparatus
201: mounting unit
210: control unit
211: authentication unit
213: sound source storage unit
215, 217: sound source playback unit
220: RFID recognition unit
230: fingerprint recognition unit
240: BT-IRDA communication unit
245: first connection unit
250: display unit
260: communication unit
270: output unit
290: remote controller
300: sound source server
400: user terminal
500: network
600: vehicle

What is claimed is:

1. A sound source playback apparatus comprising:
at least one mounting unit formed with at least one mounting groove extended in a vertical or horizontal direction to a longitudinal direction of the sound source playback apparatus,
wherein a sound service device is detachably mounted to the at least one mounting unit;
identification value assigned to the RFID module when the sound source device 100 is produced
a control unit, when the sound source device is mounted on the at least one mounting unit, recognizing tag information, which is an identification value assigned to the sound source device and associated with artist information when the sound source device is produced, performing authentication, requesting sound source data from a sound source server according to a result of the authentication, playing back the sound source data, and receiving sound source upgrade information through a communication unit,
wherein the communication unit receives the sound source upgrade information from the sound source server; and
a sound storage unit configured to receive the sound source data, via the sound source server, wherein the sound source server verifies and manages the sound source data, stores the sound source data corresponding to the identification value, and automatically provides the sound source upgrade information to the sound source device.

2. The sound source playback apparatus according to claim 1, wherein the control unit includes:
an RFID recognition unit configured to recognize tag information of the sound source device; and
an authentication unit configured to perform authentication by comparing the tag information with account information registered in a user account and determining whether the identification value matches.

3. The sound source playback apparatus according to claim 2, further comprising a fingerprint recognition unit configured to recognize a fingerprint,
wherein the fingerprint is recognized through the fingerprint recognition unit by using an image of a reflected fingerprint that is input into a charge coupled device (CCD) through a refractive lens or by reading an electrical conductivity property characteristic of the fingerprint when contacted with a surface of a silicon chip, and wherein the authentication unit performs authentication by determining whether the recognized fingerprint matches previously stored fingerprint information.

4. The sound source playback apparatus according to claim 2, wherein the control unit includes a sound source storage unit configured to store, when the authentication is performed, sound source data corresponding to the identification value received through the sound source server.

5. The sound source playback apparatus according to claim 4, further comprising a display unit configured to provide a user interface for receiving an input signal for playback of the sound source, wherein the control unit includes a sound source playback unit configured to provide a corresponding service according to the input signal input through the display unit.

6. The sound source playback apparatus according to claim 5, wherein the sound source playback unit plays back the sound source data stored in the sound source storage unit when the input signal input through the display unit is a sound source playback command.

7. The sound source playback apparatus according to claim 2, wherein when the authentication is performed, the control unit controls to store sound source data corresponding to the identification value received through the sound source server in the sound source device.

8. The sound source playback apparatus according to claim 7, further comprising a display unit configured to provide a user interface for receiving an input signal for playback of the sound source, wherein the control unit includes a sound source playback unit configured to provide a corresponding service according to the input signal input through the display unit.

9. The sound source playback apparatus according to claim 8, wherein the sound source playback unit plays back the sound source data stored in the sound source device when the input signal input through the display unit is a sound source playback command.

10. The sound source playback apparatus according to claim 2, wherein the identification value is unique tag information assigned to an RFID module of the sound source device, and the identification value is registered in the account information of the user account of a user who has purchased the sound source device.

11. A sound source playback method using a sound source playback apparatus, the method comprising:

recognizing tag information of a sound source device when the sound source device is mounted on a mounting unit, wherein the tag information includes an identification value assigned to the sound source device and associated with artist information when the sound sour device is produced and wherein the mounting unit having at least one mounting groove extended in a horizontal or vertical direction to a longitudinal direction of the sound source playback apparatus;

performing authentication by comparing the recognized tag information with account information registered in a user account and determining whether an identification value matches;

requesting, when the authentication is performed, a sound source data corresponding to the identification value from a sound source server; receiving the sound source data from the sound source server in response to the request;

storing the sound source data;

playing back the stored sound source data;

receiving sound source upgrade information from the sound source server; and automatically upgrading and storing the sound source data corresponding to the identification value, when the authentication is performed.

12. The method according to claim 11, wherein the performing authentication further includes:

using an image of a reflected fingerprint that is input into a charge coupled device (CCD) through a refractive lens or reading an electrical conductivity property characteristic of the fingerprint when contacted with a surface of a silicon chip and determining whether the recognized fingerprint matches previously stored fingerprint information when a fingerprint is recognized.

13. The method according to claim 11, wherein the playing back the sound source includes the playing back the stored sound source data when a sound source playback command is input.

14. The method according to claim 11, wherein the storing the sound source data includes the controlling to store the sound source data in the sound source device.

15. The method according to claim 14, wherein the playing back the sound source includes the playing back the sound source data stored in the sound source device.

16. The method according to claim 11, wherein the identification value is unique tag information assigned to an RFID module of the sound source device, and the identification value is registered in the account information of the user account of a user who has purchased the sound source device.

* * * * *